May 23, 1950 W. R. KOCH 2,509,066

OVERMODULATION COMMUNICATION SYSTEM

Filed May 28, 1948 2 Sheets-Sheet 1

Inventor

WINFIELD R. KOCH

By Philip G. Cooper

Attorney

May 23, 1950 W. R. KOCH 2,509,066

OVERMODULATION COMMUNICATION SYSTEM

Filed May 28, 1948 2 Sheets-Sheet 2

INVENTOR
WINFIELD R. KOCH
BY Philip G. Cooper
ATTORNEY

Patented May 23, 1950

2,509,066

UNITED STATES PATENT OFFICE 2,509,066

OVERMODULATION COMMUNICATION SYSTEM

Winfield R. Koch, Haddonfield, N. J., assignor to Radio Corporation of America, a corporation of Delaware Application May 28, 1948, Serial No. 29,767

13 Claims. (Cl. 250—6)

This invention relates to novel amplitude modulation signal receiving systems, particularly to such systems for receiving overmodulated signal-carrying waves.

One of the objects of the invention is the provision of novel signal receiver systems for receiving and demodulating overmodulated waves without overmodulation distortion.

Still further objects of the invention are the provision of novel receiver systems for overmodulated waves having detector elements for detecting the lobes of the over-modulated waves, and interconnected for shifting the overmodulated waves and alternately forming upper and lower detected signal lobes in response to movement of the overmodulated lobes toward the zero amplitude level, after which the detected signal lobes are combined to reproduce the modulating signal.

The above as well as other objects of the invention will best be understood from the following description of exemplifications thereof, reference being had to the accompanying drawings wherein.

Figure 2:
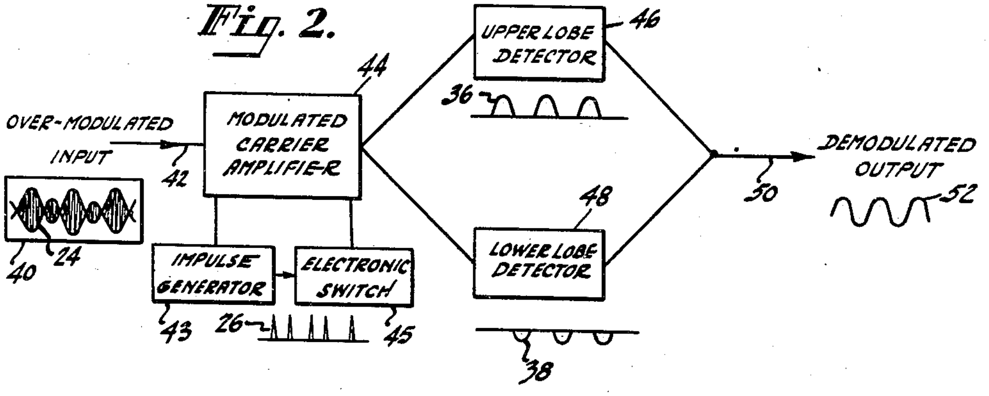
Fig. 2 is a block diagram schematically showing a communication system embodying the invention.

When carrier waves are overmodulated in amplitude by intelligence conveying signal variations, the variations interfere with each other and cannot be faithfully reproduced in ordinary receiving systems. Overmodulating conditions develop for example in many cases when a radio wave is transmitted along the surface of the earth over a distance of the order of 100 miles. At such distances the waves in addition to moving directly along the earth's surface are also transmitted by reflection from high altitude electromagnetically active atmospheric layers in such manner as to arrive at the receiver slightly later than the directly transmitted waves. The resulting phase difference between the two waves causes some of the wave maxima or peaks to reach the receiver along one path just as wave minima reach it along the other, and cancellation or serious suppression of these waves follow. When the phase difference is of the proper magnitude for causing suppression or cancellation of the carrier frequency waves with less suppression of the waves of adjacent frequencies, the signals received correspond to overmodulated waves.

Waves whose amplitudes are overmodulated by signals also may be deliberately produced by directly mixing the carrier waves with signal waves of larger amplitudes in such instances in which it may be desired to utilize overmodulated waves to produce a particular result. Under normal conditions the amount of energy carried by the modulated waves is distributed between the carrier waves and the signal waves in proportion to the relative amplitudes of these two waves before modulation. For example, when they are of the same amplitude, each contributes 50 percent of the resulting modulated wave energy. In ordinary actual practice however equal amplitudes of carrier and modulating signal, or 100 percent modulation as it is generally called, does not operate satisfactorily and at present not more than about 90 percent, or less, modulation is used. Furthermore, to allow for signal peaks when the loudest signals are produced, the modulation must be less than 100 percent to prevent distortion. By employing a receiver system embodying the invention however, overmodulated waves in which as much as two-thirds of the energy is contributed by the intelligence conveying modulations can be utilized for communication. Any such deliberately overmodulated waves accordingly carry higher intelligence-conveying signal energy than has hitherto been practicable. Furthermore, a large proportion of noise injected into an amplitude-modulated carrier wave communication system, results from external influences on the carrier waves so that reduction of the carrier amplitude diminishes the noise level at the same time as it enables increase of the signal level.

This invention, however, relates only to a system for receiving over-modulated waves, irrespective of the manner in which they may be produced. Accordingly, since the particular type of modulating system which may be employed to deliberately overmodulate a carrier wave, if so desired, forms no part of the present invention, the disclosure of a number of illustrative embodiments is restricted to a receiving system.

Figures 1, 3:
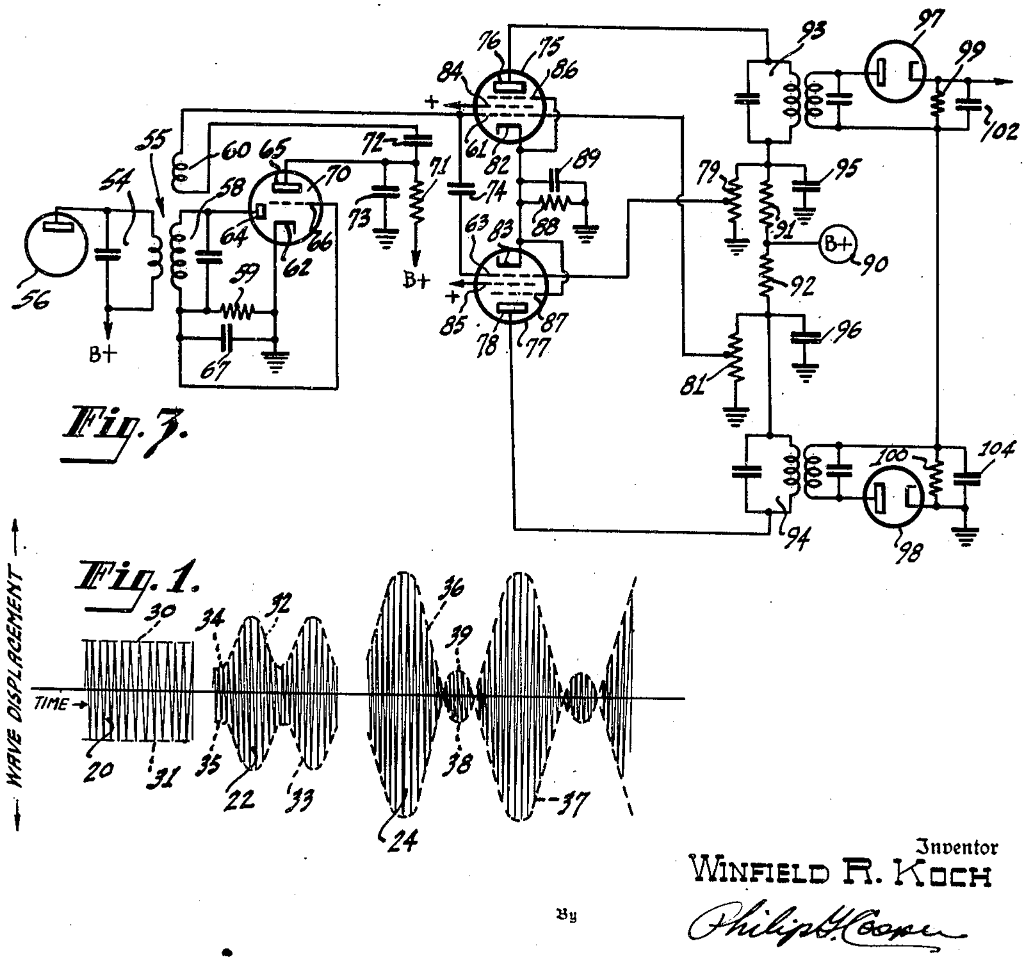
Fig. 1 is an explanatory diagram illustrating some of the characteristics of over-modulated waves.
Fig. 3 is a circuit diagram showing one form of signal receiver and demodulator exemplifying the invention.

Fig. 1 is an illustrative explanation of some of the characteristics of over-modulated waves. At 20 is represented unmodulated carrier waves having displacements varying in uniform manner with respect to time, in accordance with the wave frequency. The amplitude of the unmodulated waves is represented by the dash line wave envelope 30, 31, and is constant. At 22 the carrier waves are shown as modulated in amplitude by a modulating signal having a relative wave displacement indicated by the envelope waves 32, 33. Less than 100 percent modulation is shown at 22 and it is seen that the carrier is here changed in amplitude, becoming alternately of larger and smaller amplitude than the unmodulated carrier 20. The minimum amplitude regions however, indicated at 34, 35 are separated from each other so that at no point does the modulated wave amplitude reach the zero displacement axis. At 100 percent modulation the minimum displacement regions 34, 35, or 38, 39 would just touch the zero displacement axis without crossing it.

Overmodulated waves are represented at 24. The envelope 36, 37 corresponding to the modulating signal shows still further variation in wave amplitude, so much so that the minimum displacement regions or valleys 38 of the upper envelope 36 are below the zero displacement axis and the minimum displacement regions or peaks of the lower envelope 37 are above this axis.

An important consideration with respect to the degree of modulation is the manner in which it is demodulated at a receiver to reproduce the intelligence-conveying modulating signal. Almost all receivers are at present equipped with rectifying demodulators or detectors, which function, for example, by permitting passage of only one set of the lobes or envelope portions of the waves, such as 32, without permitting passage of the lobes 33 on the opposite side of the zero displacement axis. The passed lobes are also filtered to remove the carrier wave high frequency ripple leaving a demodulated signal essentially duplicating the original modulating signal or envelope 32 or 33, in the conventional case where the carrier is about 80 percent modulated.

With overmodulated waves, however, the mere rectification as by blocking the passage of the lower lobes, will not reproduce the original modulating signal. Instead, the resulting envelope waves such as 36 will have spurious lobe portions 39 which greatly distort them and in many cases render the demodulated signals unintelligible.

Even with 100 percent modulation, such detecting action is undesirable because when the lobe amplitudes become very small, wave rectification ceases to follow the wave displacement as a proportional or linear function but introduces undesirable variations that also cause distortion. This is a principal reason for limiting conventional signal modulation to 90 percent or less.

The modulating signal waves illustrated in Fig. 1 are represented as of only a single frequency but it is understood that the same principles apply and the same results follow with modulating signals having waves varying in accordance with many frequencies, as is normally the case.

Fig. 2 shows, in block diagram form, the construction and operation of a communication system embodying the invention. Overmodulated waves, which may be provided by a signal source 40, are supplied to the input of a receiver as shown at 42. In the case where the overmodulation is produced fortuitously, as in transmission for example, the source 40 may be considered as the receiving antenna and associated circuits and apparatus. The receiver includes a modulated-carrier-passing circuit generally in the form of an amplifier 44, the output of which includes detector elements for reproducing the modulating signal and providing the demodulated output 50. The detecting elements are arranged to selectably detect the upper and lower lobes of the carrier waves, alternately. In the form shown two separate detectors 46, 48 are provided to respectively detect the upper and lower carrier wave lobes; the receiver also includes a shift arrangement for passing the carrier wave through one detector or the other as desired.

As shown in Fig. 2, the shifting is provided by an impulse generator 43 and an electronic switch assembly 45 connected to provide a properly timed series of impulses 26. The shift arrangement responds to these pulses and passes the modulated carrier waves alternately through the detectors 46, 48 shifting the passage with each impulse. The impulses are timed so that shifting takes place at the instant the modulated carrier lobes cross the zero displacement level. As so connected, the upper lobe detector 46 may be arranged to pass the alternate upper lobes 36 of the overmodulated waves while the lower lobe detector 48 passes the alternate lower lobes 38. Both sets of lobes are then combined in the demodulator output 50 to reconstitute the modulating signal waves, as shown at 52. Efficient reproduction is thereby provided according to the invention regardless of any selective fading of the carrier or intentional or inadvertent overmodulation of the carrier due to other causes. Communication with higher signal-to-noise ratios than hitherto possible with amplitude modulation systems, is also enabled.

An additional feature of the invention is the diminution in distortion with respect to prior signal communication systems which provide 100 percent or almost 100 percent modulation of carrier waves. As pointed out above, the deviation of the detector from the linear or proportional detecting operation close to the minimum amplitude carrier levels injects distortion. With waves 100 percent modulated, these distortions extend along a relatively long wave interval corresponding to modulating signal valleys or minima, where the signal waves are reversing their motion and are changing direction at a relatively slow rate. According to the invention this non-linearity of detection takes place at a relatively steep portion of the modulating signal wave where much less of the wave is subject to distortion. The time interval between the entry of one lobe into the non-linear region and the emergence of the next lobe from the non-linear region is much smaller, than the non-linear time interval of 100 percent modulated waves. Because of the shorter time in which distortion is injected, the spurious signals that appear are of higher frequency and a larger portion falls outside the frequency range of the signals reproduced and may be filtered out so as not to interfere with the desired signals. In fact in most amplitude modulated radio communication systems, the upper limit of signal frequencies reproduced is generally quite low, about 5000 to 6000 cycles per second and any disturbances at higher frequencies are automatically excluded from the reproduced output.

Furthermore due to the push-pull or tandem action of the double detection, the distortion introduced by non-linearity of the oppositely acting detection is in the form of two equal and opposite portions slightly displaced in time. Accordingly many of the harmonic components of the distortion are neutralized and do not appear in the final output.

Fig. 3 shows one form of an overmodulation signal receiver circuit exemplifying the invention. According to this form of the invention, a modulated-carrier-passing circuit includes an input network 54, shown as the primary of a transformer 55 fed by the output or plate circuit of an electron discharge tube 56 according to conventional techniques and energized by means of a tube-operating D. C. plate voltage source B+. The transformer 55 has two secondaries, one, 58, connected to a detector shown in the form of an electron discharge diode including electron emitting cathode 62 and electron collecting anode 64 in space discharge tube 70. An additional secondary 60 of transformer 55 supplies in parallel the control electrodes 61, 63 of a pair of electron discharge tubes 75, 77. Transformer output 58, shown as a resonant circuit, may be similar to the input circuit 54, and is connected to the diode elements 62, 64 through a load resistance 59, so that these diode-elements function to rectify or detect the waves supplied and the detected signals appear across the resistance 59. Capacitance 67 may be connected across the resistance 59 to permit high frequency carrier ripples in the rectified waves to be by-passed and filtered out. The lobes of the rectified waves, in this case the negative lobes, are supplied to the input of an amplifier space-discharge section shown as included in the same tube 70, in the form of a second electron collecting plate 65 and a control grid 66 which controls the electron flow from the cathode 62 to the second plate 65. The tube is energized by connecting its plate and cathode through a loading impedance 71 to a source of D. C. potential, indicated by the B+ and ground connections.

At each time that the negative lobes of the carrier wave 24 of Figure 2 are about to cross the line representing the zero displacement level, the rate of change of the negative or lower envelope 37 is at a maximum so that there is produced a sharp current surging in the tube 70 and load impedance 71. Voltage impulses corresponding to these current surges appear across load 71 and are transmitted through blocking condensers 72 and transformer secondary 60 to the control grids 61, 63 of the tubes 75, 77. Blocking capacitor 72 isolates the high D. C. plate voltage of tube 70 from the low D. C. voltage of grids 61, 63 and also establishes an A. C. ground return connection from the low A C. potential side of secondary coil 60, in conjunction with a by-pass capacitor 73 across the plate circuit of tube 70.

Between the grids 61, 63 a D. C. blocking capacitor 74 enables these grids to operate at different bias potentials, as determined by their connections in a flip-flop network including bias resistances 79, 81. The tubes 75, 77 are each shown as pentodes, having electron emissive cathodes, 82, 83, electron collecting plates 76, 78 and two electron flow controlling electrodes in addition to the control grids 61, 63. Screen grids 84, 85 are shown as connected to suitable D. C. operating sources indicated by the + signs, and suppressor grids 86, 87 may be grounded or connected to the cathodes as in the figure. The cathodes 82, 83 of the tubes 75, 77 may be returned to ground through a biasing resistance 88, by-passed by capacitance 89 for minimizing any signal voltages that tend to appear across it. Tubes 75, 77 are operated by D. C. source 90 having its positive terminal shown at B+ connected to their plates 76, 78, through the voltage dropping resistances 91, 92 and the signal loading networks 93, 94 which in Fig. 3 are shown as resonant circuits. The voltage dropping resistances 91, 92 have their plate ends capacitively connected to ground through capacitances 95, 96 to complete the flip-flop networks.

The flip-flop or shifting action of the circuit is well-known and depends on the bias of the respective control grids 61, 63 being supplied by the voltage dropping resistances 81, 79 in an output circuit of the opposite tube of this pair. In the form shown, the various circuit constants are so selected that when one of these tubes is conducting its plate circuit is so loaded that the plate side of the corresponding loading resistor 91, 92 is lowered in potential by an amount sufficient to keep the other tube from becoming conductive. The biasing resistance 88 causes each tube grid to be biased negatively enough to substantially prevent the tubes from becoming conductive except when strong positive potentials appear at the voltage dropping resistances 79, 81. Accordingly only one tube can become conductive at any one time. However, when a positive voltage pulse strong enough to overcome any cut-off bias is applied to the control grids 61, 63, the tube previously non-conductive suddenly becomes conductive, causing its plate to fall in D. C. potential thereby transmitting a negative or falling pulse of larger magnitude to the control grid of the previously conducting tube and thereby cutting it off. The cutting off of the previously conducting tube causes its plate to rise in D. C. potential, delivering a positive pulse to the grid of the tube becoming conductive and sharpens the switching action. The delivery of a second control impulse from the input circuit to both control grids again shifts the switching action back to the original condition.

In the form shown in Fig. 3, the switching tubes 75, 77 not only alternate in conductivity but are connected to amplify the signal modulated carrier waves fed to the grids from the secondary winding 60 of transformer 55. Accordingly as the tubes alternately conduct, they also alternately deliver lobes of amplified signal-modulated carrier to their output networks 93, 94. These networks are respectively coupled to detectors 97, 98 where the lobes are rectified or demodulated, delivering the demodulated outputs to the respective detector loading impedances. Capacitances 102, 104, connected across these impedances filter out the high frequency carrier wave ripple, leaving only the modulating signal lobes. By proper interconnection of the detectors 97, 98 as shown, the alternate lobes indicated at 36, 38 in Fig. 2, are combined to reconstitute the desired signal. The load 99 is arranged to develop positive signal lobes at its cathode and with respect to its other side and the load 100 develops negative signal lobes at its plate end with respect to its cathode end which is grounded. The reconstituted output is taken between the cathode end of load 99 and ground.

Other forms of shifting detector apparatus may also be used. Thus the impulse generating elements may be modified to provide sharper impulses. For example control grid 66 may be biased so that only the extreme upper tips of the negative carrier wave envelope produced at the junction of adjacent ones of the lower lobes cause plate current surges to appear. The bias may be adjustable to provide the desired sharpness. This is especially useful as for example where the incoming signal-modulated carrier waves are subject to phase distortion or shifting in which case the wave amplitude may never get down quite to zero but blends smoothly between lobes on the same side of the zero amplitude axis. In other words the small sharp angles where adjacent lobes such as 36 and 39 intersect becomes a rounded trough removed from the zero amplitude axis. For incoming waves of such characteristics, the impulse generation can be adjusted to take place at the negative peaks between adjacent negative lobes, even though these peaks are not at the zero amplitude level. The adjustable bias may be conveniently supplied in any well-known manner, as by a variable resistance inserted between the cathode 62 and the resistance 59. The variable biasing resistance may be capacitively by-passed. The bias may also be supplied through a separate grid resistance directly to the control grid 66, in which case the control grid lead from the detector load 59 should include a D. C. blocking capacitance to isolate the D. C. bias.

As a further modification the switching impulses and the modulated carrier lobes may be fed in parallel rather than in series. For example, the low A. C. voltage side of secondary winding 60 may be coupled directly to ground as through a capacitance, and the plate 65 of tube 70 directly capacitively coupled to the grids 61, 63. In this form, the capacitances 72, 73 are not needed. Alternatively, the coil 60 may be arranged to feed the grids 61, 63 in push-pull or tandem, from the coil ends, the coil being connected to ground at its center.

Figures 4, 5, 6, 7:
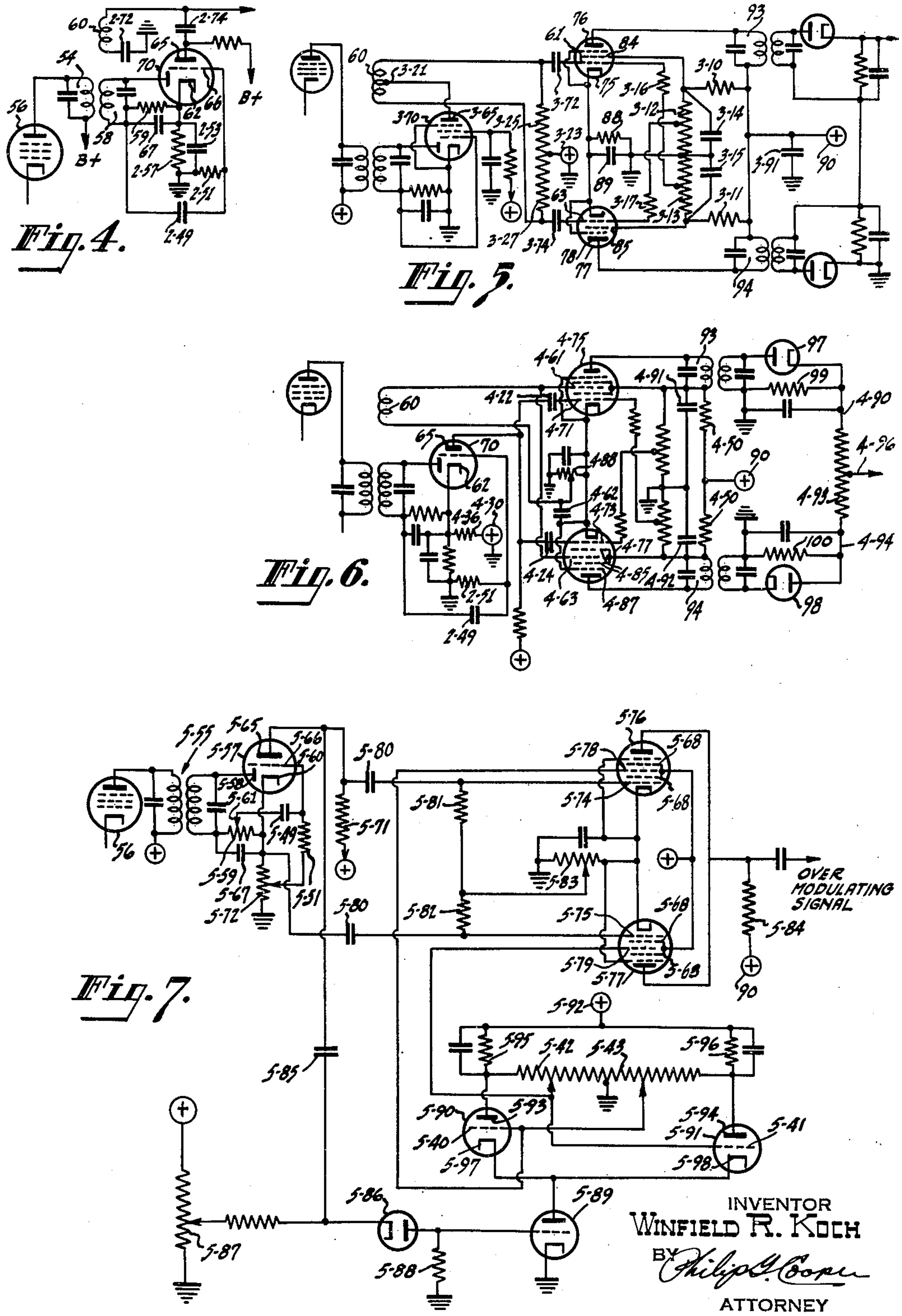
Fig. 4 is a circuit diagram of a modification of a portion of the system of Fig. 3.
Figs. 5, 6 and 7 are circuit diagrams similar to Fig. 3 of further modifications of a signal receiver and demodulator according to the invention.

Fig. 4 shows one form of parallel feed arrangement for the switching impulses and carrier lobes. The circuit is generally similar to that of Fig. 3 above and corresponding components are similarly numbered. Coil 60 is however, by-passed to ground at one end by means of capacitor 2—72 and has its other end connected to the switching and amplifying circuit as well as to the impulse output circuit by capacitor 2—74 coupled to plate 65. Capacitor 2—72 has a relatively high impedance to the low frequency switching impulses and prevents loading of the impulse circuit output.

Fig. 4 also shows the provision of an additional bias to the impulse forming circuit. The triode section of tube 70 has its cathode 62 grounded through a bias resistor 2—57 by-passed by capacitor 2—53 so that the cathode is positively biased with respect to ground by the voltage appearing across resistor 2—57 upon the passage of plate current through tube 70. The grid 66 is returned to ground through grid resistor 2—51 and is accordingly held at a negative bias potential with respect to the cathode. The connection between the grid 66 and the detector load includes capacitor 2—49 which blocks the positive D. C. bias from the grid.

Other forms of switching or flip-flop arrangements may also be used as described for example in Puckle's "Time bases," published in 1943 by Chapman and Hall, Ltd., pp. 50 et seq. Thus the switching circuit need not simultaneously be used as an amplifier but may merely control separate amplifiers or directly effect detecting action, as by biasing separate amplifiers or the detectors 97, 98 in accordance with the conductive condition of the tubes 75, 77. For example, each detector diode 97, 98 may be connected to assume the same relative potential as the potential between each of the respective control grids 61, 63 and the corresponding cathode of tubes 75, 77. The polarities may be so adjusted that when one of the tubes 75, 77 is non-conducting, the associated detector is also cut-off, and when the tube is conducting its grid bias is zero and the corresponding detector, fed directly from the input at 55, operates normally. A capacitive coupling between the switching tubes and the detectors may be used to controllably bias them only by means of the switching pulses, permitting both detectors to operate when no shift control pulses are received, as for example, when the incoming signals are not overmodulated. Similar double detection may be provided by capacitively coupling the impulse generator of Fig. 3 to the switching tubes. The shift control pulses which are in the form of approximately square waves, may be taken from only one of the switching tubes and may be supplied to both detectors being switched.

The switching circuit connections to the switching tubes 75, 77 may also be modified in any well known manner, as by connecting the switching load resistances 91, 92 and the voltage dropping resistances 79, 81 in the D. C. circuits supplying the screen grids 84, 85 instead of the plates 76, 78. Inasmuch as cutting off the tube decreases the screen currents as well as the plate currents, similar action is produced with either connection. The suppressor grids may likewise form part of the switching network by taking advantage of their characteristic of becoming more negative when the screen grid voltages are increased for example. Apparently the electron flow in the tube is accelerated by the increase in screen voltage, increasing the plate current but causing fewer electrons to be collected by the suppressor grid, making the suppressor as well as the plate more negative. In this modification the screen grids may be connected as the inputs of the switching network and the suppressor grids if used as the outputs are connected to ground through loading resistances.

Fig. 5 exemplifies a combined amplifying and switching circuit of the invention in which the switching function is associated with the screen grid electrodes of electron discharge tubes. Pentode tubes 75, 77, which may be the same as those shown in Fig. 1, have their plates 76, 78 connected to the output detector circuits including plate loading networks 93, 94 directly from the common power supply 90, which may be bypassed by capacitor 3—91. Screen grids 84, 85 are supplied from the low signal potential sides of the respective networks 93, 94, through resistors 3—10, 3—11, and are shown as loaded by ground return resistors 3—12, 3—13 also capacitively bypassed by capacitors 3—14, 3—15. Feedback from the screen load resistors to the opposite grids is established by the resistors 3—16, 3—17. The amplifying and switching arrangement is otherwise similar to that shown in Fig. 3.

The embodiment illustrated in Fig. 5 also includes a push-pull feed to the grids 61, 63 of the self-switching amplifier tubes 75, 77. Signal output coil 60 has its ends connected to the respective grids 61, 63 through coupling condensers 3—72, 3—74, and has a center tap 3—21 connected to the impulse supply plate 3—65 of impulse amplifier tube 3—70 shown as of pentode type. The coil 60 and its output are also shown as establishing the B+ energizing circuit of tube 3—70 from a D. C. source 3—23 through isolating resistors 3—25, 3—27 connected to the respective ends of coil 60. The energizing circuits are completed by ground connections as shown.

The switching tubes 75, 77, may also be of any other suitable types, such as pentagrid electron discharge tubes in which the switching pulses and the signals to be amplified are independently supplied to separate control grids connected in separate switching and amplifying circuits. The tubes may also be of the tetrode or triode types if desired.

Fig. 6 is a circuit diagram of a further modification of the invention in which the switching circuit is distinct from the amplifying circuit, although both are controlled by the same electron discharge tubes. These tubes are shown at 4—75, 4—77 as of the converter type having respective signal input grids 4—61, 4—63 and switching grids 4—71, 4—73 shielded from each other by screen grids 4—84, 4—85 which also function as electron accelerating grids for the amplification action. Suppressor grids 4—86, 4—87 may also be provided and connected to the respective cathodes as in the examples of Figs. 3 and 5.

The switching grids 4—71, 4—73 are connected in a flip-flop switching circuit with the reciprocal screen grids in a manner similar to that shown in Fig. 5 above. The tube-energizing B+ source 90 may include series resistors 4—50, 4—51 bypassed by the respective capacitors 4—91, 4—92. Signal supply for amplification is effected by directly connecting one end of output coil 60 to both signal grids 4—61, 4—63 and returning the other end of the coil to the common cathodes of tubes 4—75, 4—77. In the form shown the signal return is through the bypass capacitor 4—62 while the coil return is conductively established to a tap on the cathode return resistor 4—88 to supply the desired D. C. bias to the signal grids with respect to the cathodes.

The switching grids 4—71, 4—73 are connected through capacitors 4—22, 4—24 for receiving the switching impulses appearing at the plate 65 of the impulse amplifier tube 70. The impulse amplifier circuit of tube 70 is shown as including an external bias source 4—30 for suitably controlling the amplification and improve the peaking action, as described above. The bias source 4—30 may be an adjustable bleeder on a D. C. supply and is shown as connected to the cathode 62 through an isolating resistor 4—26 for adjusting the positive potential of the cathode with respect to the grid. Aside from the independence of the amplification and switching circuits, the arrangement of Fig. 6 operates in essentially the same manner as that of Fig. 5.

Fig. 6 also includes a variation of the output detector network in accordance with the invention. The polarity of detection is arranged as by suitably connecting the detectors 97, 98 and their output loads 99, 100 for causing the positive signal lobes to appear at one output load terminal, such as 4—90 with respect to the signal return, while the corresponding negative signal lobes appear at one terminal 4—94 of the other detector load. The two signal lobes are then combined by connecting the terminals 4—90, 4—94 in parallel to a common output connection 4—96 through a center-tapped impedance such as resistor 4—93.

The self-switching emplifying arrangement, as shown in connection with Fig. 3 may be used as a stage of the intermediate frequency amplification normally used in heterodyne type receivers. Automatic volume control (AVC) may also be incorporated, as by filtering the output of a suitable detector and supplying the filtered output as bias voltages to amplifier tubes such as tube 56 in any well known manner.

Additional modifications include the use of the switching tubes such as 75, 77 to amplify the detected outputs instead of the undetected modulated waves. This arrangement is suitable where these tubes are connected so as to apply separate bias voltages to detector 97, 98 and the detected signals accordingly appear at the control grids and can be derived from the plate circuits of these tubes.

Fig. 7 shows one modification of the invention in which the signal lobe switching is effected after detection. As shown the circuit includes an input supply in the form of band-pass transformer 5—55 which may supply input signals from a preceding amplifier stage such as a conventional intermediate frequency amplifier using electron discharge tube 56. The signals are supplied to and detected by the diode elements 5—58, 5—60 of electron discharge tube 5—57 and appear across the diode load 5—59 which is bypassed for high frequency carrier components by capacitor 5—67. Any selected fraction of the detector output may be taken as by means of an adjustable tap 5—61 and supplied for passage through another tube section which may be separate from or incorporated in the same tube envelope with the detector as shown. This additional section shown as a triode including cathode 5—60, control grid 5—66 and plate 5—65 is operated as a phase splitter by inserting output loading resistors 5—71, 5—72 in the plate and cathode leads respectively and taking off output signals from points adjacent the tube ends of these loading resistors. The input may be capacitively supplied from the detector as by capacitor 5—49 and the grid return resistor 5—51 may be connected to an intermediate portion of the cathode output load so as to provide suitable bias voltage for the tube.

The split-phase output, so-called because the plate output signals are opposite in phase with respect to the cathode output signals, are separately applied to signal control grids 5—74, 5—75 of switching amplifier tubes 5—76, 5—77, shown as of the pentagrid type, each having an additional control grid 5—78, 5—79. The different control grids of each tube are shielded from each other by screen grids 5—68, as in the similar arrangement of Fig. 6, and the signal grids which are supplied through blocking capacitors 5—80 are returned to the tube cathodes which are connected together, through the separate grid return resistors 5—81, 5—82. The common cathodes may be returned to ground through the by-passed resistor 5—83.

Both switching amplifiers 5—76, 5—77 are energized in parallel from a D. C. source 90, the positive terminal of which is connected through a common plate loading resistor 5—84 to the tube plates. The final output from the load 5—84, which may be capacitively connected as shown, will contain alternately one signal lobe derived through one switching amplifier tube, and the next lobe derived through the other amplifier tube, the successive lobes being inverted in polarity due to the oppositely phased outputs of the phase splitter, to reconstitute the original signal.

In the form shown the lobe selection is accomplished with a separate switching generator supplying the properly timed control signals to the control grids 5—78, 5—79 for rendering one or the other of the tubes inactive for amplification. The switching generator of Fig. 7 is energized from a signal lead such as one of the oppositely phased outputs of the phase splitter 5—57. The switching actuation may be supplied through blocking capacitor 5—85 and pulse peaking diode 5—86 biased as by the bleeder resistance chain 5—87 to pass only the sharp vertices between adjacent lobes of detected overmodulated waves. The peaked output across loading resistor 5—88 may be supplied to a trigger tube 5—89 shown as a triode which interacts to alternately cut off one and then the other of a pair of triode flip-flop tubes 5—90, 5—91. As shown, the three tubes 5—89, 5—90 and 5—91 are energized by a single D. C. source 5—92 which is connected to the plates 5—93, 5—94 of flip-flop tubes 5—90, 5—91, through capacitively by-passed plate resistors 5—95, 5—96. The cathodes 5—97, 5—98 of these tubes are connected together and return to ground through the electron discharge path between the plate and cathode of tube 5—89. Flip-flop interaction is provided by the interconnection of the control grids 5—40, 5—41 with the outputs of the reciprocal plates, which in the embodiment of Fig. 7 are developed across respective grounded plate return resistors 5—42, 5—43. The flip-flop feedback may be connected to taps on these plate return resistors.

In the flip-flop circuit of Fig. 7 under equilibrium conditions, one of the tubes 5—90, 5—91 is cut-off and one is conducting. Trigger tube 5—89 is supplied with sharp cut-off pulses thereby cutting off the flip-flop tube previously conducting, and generating a sharp positive pulse in its plate return resistor which pulse is transmitted to the grid of the other tube rendering the other tube conductive just as the triggering impulse is completed. The action then repeats at the next triggering impulse to restore the original condition of the flip-flop tubes 5—90, 5—91.

The switching pulses generated by the flip-flop tubes are transmitted to the switching amplifiers 5—76, 5—77 as by connecting the control grids 5—78, 5—79 of these amplifiers to the control grids of the flip-flop tubes and the successive lobes of the detected overmodulated waves are amplified, combined and delivered oppositely phased to faithfully reconstitute the overmodulating signal.

The above-described features of the invention may be combined with each other in different groupings. Thus for example, switching and amplification in the construction of Fig. 7 may be with the self-switching amplifier types as shown in Figs. 3, 5 or 6; or the pulse peaking arrangement of Fig. 7 may be omitted if desired. AVC may be incorporated in the alternately conducting stages 5—76, 5—77 of the construction of Fig. 7, as by connecting a tap from resistor 5—59 to the junction between grid return resistors 5—81, 5—82. The AVC connection may be through an isolating resistor and the grid returns may be capacitively by-passed to ground to complete the input circuit for the A. C. signals.

While several exemplifications of the invention have been indicated and described above, it will be apparent to those skilled in the art that other modifications may be made without departing from the scope of the invention as set forth in the appended claims.

What is claimed is:

1. In an amplitude modulation signal receiver system for receiving and deriving modulation signals from electric waves overmodulated in amplitude and having upper and lower trains of signal lobes; circuit means having an input for receiving and passing said overmodulated waves; detector elements for detecting the lobes of at least one train of said signal lobes; and shift means connected with said circuit means for response to movements of a lobe envelope toward the zero amplitude level for alternately shifting the passage of said lobes through the receiver system and operating said detector elements in alternation so that the lobes passed are alternately above and below a zero signal level; said system having an output in which the alternately passed lobes are combined to reproduce the modulation signals.

2. In an amplitude modulation signal receiver system for receiving and deriving modulation signals from overmodulated electric waves having upper and lower signal lobes; circuit means having an input for receiving and passing said overmodulated waves; detector elements forming part of said circuit means and selectably connected for separately detecting the upper and the lower signal lobes of said overmodulated waves; and shift means connected with said circuit means and responsive to movements of a lobe envelope toward the zero amplitude level for alternately shifting the passage of overmodulated waves through the detector elements to alternately detect said upper and said lower lobes; said detector elements having an output in which separately detected lobes are combined to reproduce the modulation signal.

3. An amplitude modulation receiver as defined by claim 2 in which the detector elements include two separate detector circuits having independent input means and a combined output circuit; and the shift means is connected for alternately preventing signal passage to one and then the other of said independent input means.

4. An amplitude modulation receiver as defined by claim 3 in which the shift means includes a two-channel flip-flop network connected for actuation by movements of signal lobes through the zero amplitude level to alternately open one channel and substantially simultaneously close the other.

5. An amplitude modulation receiver as defined by claim 4 in which the shift means includes impulse supply means for supplying impulses coordinated with the signal lobes to shift the flip-flop network; the flip-flop network comprises a pair of space discharge amplifier sections interconnected so that increase in conductivity of either section causes the other section to become non-conductive; each section having an input circuit and a separate output circuit; the output circuit of each section being coupled to the respective independent detector input circuits; the input circuit of each section being coupled to the circuit means for receiving the signal waves; and the sections being also coupled to the impulse supply means for causing said sections to simultaneously amplify and shift the signal waves through the detector circuits.

6. A amplitude modulation receiver as defined by claim 2 in which the shift means includes a flip-flop network connected for response to shift impulses, and also includes impulse supply means having detector structure coupled to the circuit means for passing only one set of signal lobes and developing pulses as the signal lobes approach the zero amplitude level.

7. An amplitude modulation receiver as defined by claim 6 in which the detector structure is coupled to pass the lower lobes; and the impulse supply means includes space discharge amplification elements connected for amplifying the peaks of the lower lobes.

8. An amplitude modulation receiver as defined by claim 7 in which the space discharge amplification elements are biased for passing only those portions of the lower lobe peaks which are approximately at the zero amplitude level.

9. In an amplitude modulation signal receiver system for receiving and deriving modulation signals from overmodulated electromagnetic waves having corresponding signal-modulated envelopes respectively of positive and negative polarity relative to a common zero displacement axis, each of said envelopes normally being on one side only of said axis but as a result of said overmodulation a relatively small portion of each of said envelopes being on an opposite side of said axis from a relatively large portion thereof, said receiver system comprising, a first signal detector for demodulating waves having envelope portions on one side of said axis, a second signal detector for demodulating waves having envelope portions on the other side of said axis, switching means responsive to a diminishing relatively small amplitude of one of said envelopes to impress said waves alternately upon said detectors in proper polarity to effect demodulation of substantially all of said waves defined by both portions of one of said envelopes, and a common output circuit for said detectors in which to develop the complete modulation signal.

10. An amplitude modulation receiver as defined in claim 9, in which respective load circuits are provided for said detectors, said detectors being connected to develop similarly polarized voltages in said respective load circuits, and said common output circuit comprises the oppositely polarized connection of said load circuits.

11. An amplitude modulation receiver as defined in claim 10, in which said switching means comprises two electronic tubes coupled for alternate operation and having output circuits coupled respectively to said detectors.

12. An amplitude modulation receiver as defined in claim 11, in which said switching means includes an impulse generator responsive to said small envelope amplitudes and is coupled to the input circuits of said electronic tubes to operate said tubes in alternation.

13. An amplitude modulation receiver as defined in claim 12, in which said impulse generator develops a series of impulses similarly polarized to initiate space current conduction in a non-conducting one of said tubes, and the input and output circuits of said tubes are cross-connected so that the initiation of current conduction in one of said tubes renders a conducting tube non-conducting.

WINFIELD R. KOCH.

REFERENCES CITED

The following references are of record in the file of this patent:

UNITED STATES PATENTS

| Number | Name | Date |
|---|---|---|
| 1,360,740 | Hartley | Nov. 20, 1920 |
| 2,113,214 | Luck | Apr. 5, 1938 |
| 2,275,298 | Hugenholtz | Mar. 3, 1942 |
| 2,302,852 | Goddard | Nov. 24, 1942 |